United States Patent Office 2,831,975

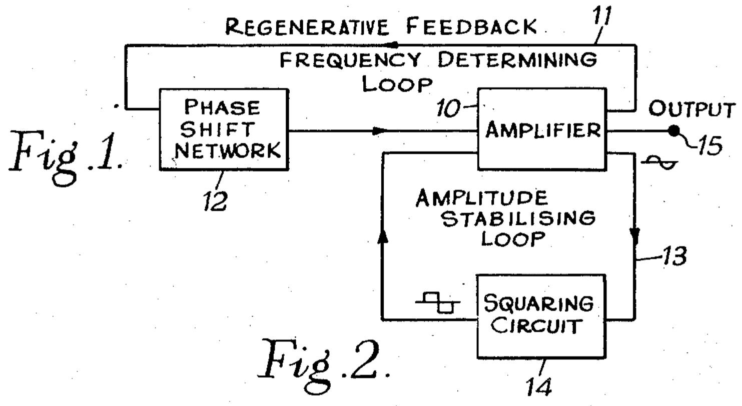
Fig. 1. Fig. 2.
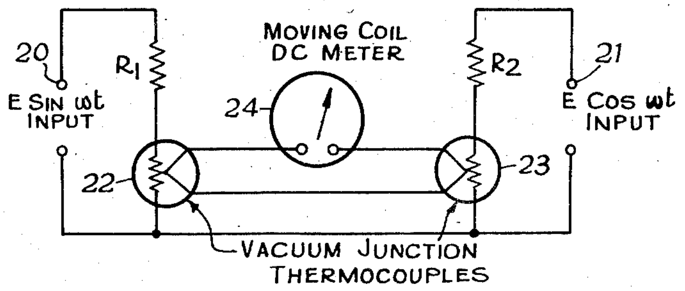
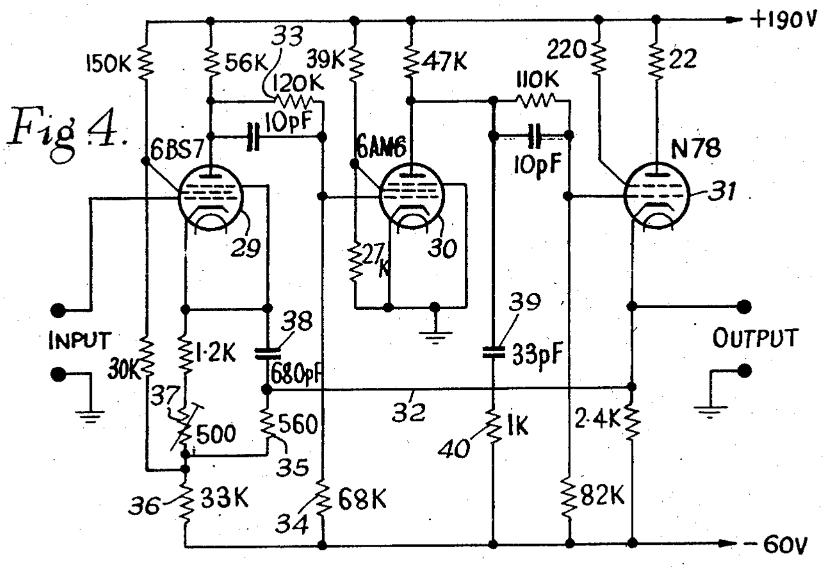
Fig 4.
INVENTOR
Reginald Catherall
BY
Ralph B. Stewart
ATTORNEY INVENTOR
Reginald Catherall
BY
Ralph B. Stewart
ATTORNEY INVENTOR
Reginald Catherall
BY
Ralph B. Stewart
ATTORNEY INVENTOR
Reginald Catherall
BY
Ralph B. Stewart
ATTORNEY

Patented Apr. 22, 1958

2,831,975

LOW FREQUENCY OSCILLATORS AND THE MEASURING OF THE AMPLITUDE OF LOW FREQUENCY OSCILLATIONS

Reginald Catherall, Ashford, England, assignor to The Solartron Electronic Group Limited, Thames Ditton, England

Application May 26, 1955, Serial No. 511,313

9 Claims. (Cl. 250—36)

This invention relates to low frequency oscillators and to the measuring of the amplitude of low frequency oscillations.

One aspect of the invention relates to improved means of stabilising the amplitude of the oscillations in a low frequency oscillator. Another aspect of the invention relates to improved amplitude measuring means suitable for use in conjunction with the improved oscillator.

The invention is particularly advantageous in oscillators designed to work at frequencies below 10 C. P. S. and especially to oscillators working over a variable frequency range part of which at least is below 10 C. P. S. The amplitude measuring means has especial advantages at frequencies below .5 C. P. S.

The invention is of value not only in that it can be used at these very low frequencies and at variable frequencies including such low frequencies, but also in that it can be used over a relatively wide range of frequencies down to and including these low frequencies, for example over a range covering from above the audio frequency range down to low subsonic frequencies of the order of 0.1 C. P. S. or even .01 C. P. S. or less. Thus, apparatus has been designed incorporating the invention covering the frequency range from about .01 C. P. S. to about 100 Kc. P. S.

The resistance-capacity regenerative feedback type of oscillator is now almost exclusively used for generating audio frequency oscillations, and when fitted with a "thermistor" lamp, or similar amplitude-stabilising device, gives sufficiently good performance at such frequencies to meet almost every need.

The above-mentioned type of oscillator has not hitherto met with much success at frequencies below 10 C. P. S., principally due to the lack of a device which will replace the "thermistor" or lamp, such components being quite unsuitable for use at frequencies below that at which their own natural time constants become comparable with the periodic time involved.

Oscillators for operation at subsonic frequencies, have usually been attempted on the basis of scaling up the time constants of the phase shift networks employed, utilising directly-coupled amplifiers to eliminate phase shift in intervalve couplings and completely ignoring methods of amplitude stabilisation; consequently, such systems, when oscillating under conditions of good wave form, have very poor amplitude stability.

A further disadvantage of known low frequency oscillators has been the lack of a suitable device for indicating the amplitude of the oscillation. Heavily damped meters have been employed for frequencies down to approximately .5 C. P. S., but such devices are, of course, quite unsuitable for frequencies of, say, .01 C. P. S., in view of the extremely lengthy response period involved. The cathode ray oscillograph has, up-to-date, been the most satisfactory answer to this problem, but is quite an involved piece of equipment to build into the actual oscillator unit.

According to the present invention a low frequency oscillation generator comprises an amplifier, a regenerative loop circuit coupling the output to the input of the amplifier and containing a phase-shifting network, the gain of the amplifier being sufficient to overcome the loss in the loop circuit at a frequency at which the phase shift of the said network is zero, and an amplitude-stabilising loop circuit connected to couple the output of the amplifier or a section thereof to the input of the amplifier or section, and containing means for squaring the waveform of the oscillations passing therethrough.

In this specification, and in the claims, the term "amplifier" is intended to include devices whose gain is unity, or even less than unity, unless the context requires otherwise.

According to a subsidiary feature of the invention, the oscillation generator includes means for measuring the amplitude of oscillations generated at two points in the amplifier at which oscillations differing in phase by 90° are generated, the measuring means comprising means adapted to measure the sum of the squares of the amplitude of the oscillations at the two points.

The invention will be described, by way of example, with reference to the accompanying drawings in which Figure 1 shows a block diagram illustrating the principle of the square wave amplitude stabilising means employed in accordance with the invention;

Figure 2 illustrates an embodiment of amplitude measuring means according to a subsidiary feature of the invention;

Figure 4 shows a circuit diagram of a unity-gain amplifier suitable for use in the oscillator system of Fig. 3;

Figure 3:
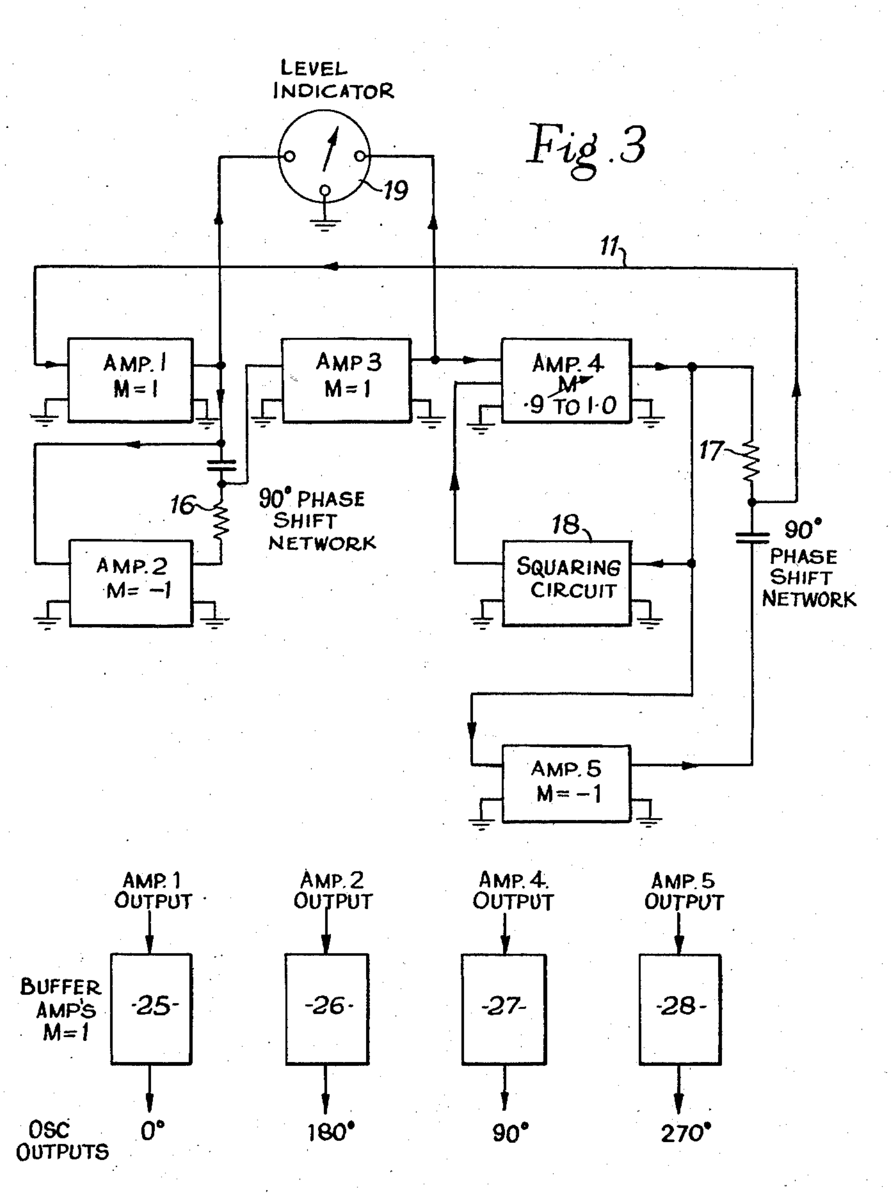
Figure 3 shows a block diagram illustrating an oscillator system according to the invention.

Referring to Fig. 1, there is shown an amplifier 10 having a regenerative feed-back loop 11 containing a phase-shift network 12. Such an arrangement will be self-oscillatory if the gain of the amplifier 10 is sufficient to overcome the loss in the phase-shift network 12 at the "no phase shift frequency" of the network (hereinafter referred to as the tuned frequency). If the gain of the amplifier 10 is reduced to a value slightly below that necessary for sustained oscillation, the amplifier system 10, 11, 12 will then behave as a selective amplifier or wave analyser, i. e. high gain from the amplifier will be obtained only in the region of the tuned frequency.

If the system 10, 11, 12 were presented with a square wave input, the repetition frequency of which agreed with the tuned frequency of the system, the signal present at the output of the system would be almost entirely the fundamental component of the square wave input, the degree of filtering taking place being dependent upon the operative selectivity of the system.

Providing that the tuned frequency of the selective amplifier system 10, 11, 12 can be varied without appreciable change in the overall gain of the system, and that a constant amplitude square wave input can be presented, always at the tuned frequency, we have achieved a system which will deliver a constant output voltage of variable frequency.

The required square wave input is provided in Fig. 1 by an amplitude stabilising loop 13 serving to extract a part of the sinusoidal output from the amplifier 10, to square the waveform of this output by means of a circuit 14, and to apply the squared waveform to the input of the amplifier 10 in combination with the sinusoidal oscillation from the phase-shift network 12. The circuit 14 is designed to limit the amplitude of both half cycles at predetermined levels and the amplitude of the square wave is, therefore, constant. Since the square wave is derived from the sinusoidal oscillation from the network 12, its frequency will always be at the tuned frequency. The arrangement of Fig. 1, with an appropriate value of the gain of the amplifier 10 is self-maintaining, and the output at terminal 15 is sinusoidal. If direct couplings are used in the amplifier 10, the arrangement described has no bottom limit of frequency.

A certain degree of waveform distortion must necessarily be present in the output voltage at 15, due to the incomplete filtering action of the selective amplifier system 10, 11, 12. If the selectivity of the system is increased, the quality of the waveform is improved, but the degree of stiffness of amplitude control is correspondingly reduced. However, it has been both calculated and proved in practice that, when the necessary selectivity is employed to give a waveform with approximately 1% harmonic distortion, the stabilising action of the loop 13 is sufficient to limit amplitude changes to within ±5% of nominal value over a frequency range from .01 C. P. S. to 10 Kc. P. S. with the type of amplifier and phase-shift network hereinafter described.

It must be emphasised at this stage that the amplitude stabilisation provided by the arrangement described is by no means as stiff as that obtained when using "thermistor" or lamp control in an audio frequency oscillator. It is, therefore, essential that the amplifier and the phase-shift networks employed be designed for minimum transmission error over the working frequency range. The performance figures quoted in the previous paragraph apply to an oscillator utilising 1% tolerance components in the phase-shift network and employing conventional degenerative feed-back amplifiers for all circuit operations. Degenerative feedback amplifiers are ideally suited to this application as, in addition to giving good gain stability, they have the advantage of high input impedance for accepting signals from the phase-shift networks and low output impedance which is necessary for driving the networks.

Referring to Fig. 3, the oscillator here shown has a 4-phase output, each phase yielding 10 volts R. M. S. with respect to earth and a level of zero volts when the oscillator is prevented from oscillating. The phases are at 90° to one another.

The amplifier in this example is constructed in a number of sections, each being a direct-coupled degenerative feedback amplifier of gain M substantially equal to unity or minus unity.

The output of the first section, indicated as AMP.1, which has a gain of unity, is connected to one terminal of a phase-shift network 16 consisting of a capacitor and a resistor in series, and to the input of an amplifier section, AMP.2, of gain minus unity, that is to say it produces a phase reversal with unit gain. The output of this section is connected to the other terminal of the network 16, which thus is connected between two points at which oscillations have the same amplitude and opposite phase. The junction of the resistor and capacitor of the network 16, at which the voltage leads that at the output of AMP.1 and lags with respect to that at the output of AMP.2 by 90°, is connected to the input of a further amplifier section AMP.3 of unit gain. The output of this section is applied to the input of another section AMP.4, whose output is connected to one terminal of a phase-shift network 17, and to the input of a further amplifier section AMP.5 of gain minus unity, the output of this section being connected to the second terminal of the network 17. The junction of the resistor and capacitor of the network 17 is connected by lead 11 to the input of section AMP.1.

The circuit components so far described correspond to 10, 11 and 12 in Fig. 1. In order to analyse the behaviour of this loop circuit, it is necessary to assume that an oscillation is present. Consider, therefore, 10 volts R. M. S. to be present at the live output terminal of AMP.1. There is thus available, between the live output terminals of AMP.1 and AMP.2 a 20 volt signal balanced about earth. This 20 volt signal is applied to the network 16 in which the values are chosen such that the reactance of the capacitor is numerically equal to the resistance at the desired frequency of oscillation (the tuned frequency). The voltage present between the resistor/capacitor junction and earth will thus be 10 volts, and its phase will lead that of the output of AMP.1 by 90°.

At first ignoring the amplifier section AMP.4, and assuming a direct connection, the functions of sections AMP.3 and AMP.5, together with their associated 90° phase shifting network 17, are identical with those, previously described, of sections AMP.1 and AMP.2 with network 16, except that the phase shifting network 17 is connected to give a 90° lagging phase shift with respect to the output from AMP.3. The output from the junction of the resistor and capacitor of the network 17 is thus a 10 volt signal whose phase is identical with that originally assumed at the live output terminal of AMP.1; consequently, in view of the unity gain of AMP.1, the necessary conditions for oscillation have been met.

The loop behaviour as considered above has no amplitude control, assumes zero losses in the networks 16 and 17, and would permit no error whatsoever in the assumed values of unity gain. The amplifier section AMP.4, having a gain variable from slightly below unity up to unity or a little above unity, is included for two reasons; firstly, to permit precise adjustment of the overall loop gain to the desired value, and secondly, to enable the square wave voltage previously mentioned to be added in without disturbing the functioning of the phase shift networks.

The necessary square wave input for AMP.4 is obtained by further amplifying the output from this section and amplitude clipping at a predetermined value. This is achieved in a squaring circuit 18.

The outputs of amplifier sections AMP.1 and AMP.3 are each 10 volts but they are displaced 90° in phase relatively to one another. These amplifier sections are designed with sufficient power output capacity to drive a two-phase amplitude-level indicator 19, in addition to driving the networks 16 and 17.

Fig. 2 illustrates one form that the measuring device 19 of Fig. 3 may take according to a feature of the present invention. This utilises two voltages of equal amplitude which are displaced in phase by 90°. These two voltages $E \sin \omega t$ and $E \cos \omega t$ are applied to terminals 20 and 21 respectively and through resistors $R_1$ and $R_2$ to the heaters of vacuum junction thermocouples 22 and 23. The outputs of the thermocouples are applied in series-adding relation to a moving coil, direct current meter 24.

The moving coil meter 24 will, to a first order, give an indication of E independent of the frequency and of the point in time in the cycle.

Thus assuming the thermocouple E. M. F. to be proportional to the square of the heater current, E. M. F.'s are obtained from the thermocouples 22 and 23 proportional to $E^2 \sin^2 \omega t$ and $E^2 \cos^2 \omega t$. The instantaneous voltage applied to the moving coil meter 24 will thus be proportional to $E^2(\sin^2 \omega t + \cos^2 \omega t)$ and hence to $E^2$.

The meter indication will thus remain constant throughout the cycle of oscillation, and in its ideal state will not be frequency-sensitive.

Such a system will behave satisfactorily for periodic times of oscillation which are both high and low compared with the response time of the vacuum junction thermocouples, but will be susceptible to a certain amount of ripple on the indication in the region of the tuned frequency hereinbefore mentioned, if the response times of the two vacuum junction thermocouples employed are not matched to a close order.

It will be readily apparent that the meter 24 used can be directly calibrated in terms of R. M. S. oscillator voltage.

Any measuring means which measure the sum of the squares of the amplitude of two equal sine waves at 90° phase difference are within the principle of this feature of the invention, but the use of thermocouples in series is preferred as giving a simple and convenient method of measuring the amplitude.

The new amplitude measuring means described above is particularly useful in connection with oscillations of a very low frequency such as can be produced by the improved low frequency oscillators described herein. It will be readily apparent that in the case of oscillations which require 100 seconds or more to complete their cycle, conventional methods of measuring the amplitude of such oscillations would require at the very least a like period of time in which to effect measurement, and even the very expensive cathode ray oscillograph equipment would require at least half this period. With the new amplitude measuring means described herein however, it is possible to measure the amplitude of oscillations requiring any period of time in which to complete their cycle, within a time independent of the period of such oscillations and dependent only on the time constant of the measuring means adopted, which in the case of the preferred form using suitable thermocouples is of the order of 1 or 2 seconds.

In order that reasonable power output may be taken from the oscillator of Fig. 3 at any of the four phases, without undesirable reflection from load impedances into the oscillator loop, four unity-gain buffer amplifiers may be employed. These are indicated at 25, 26, 27 and 28 in Fig. 3 and have their inputs connected to the outputs of amplifier sections AMP.1, AMP.2, AMP.4 and AMP.5, respectively, although such connections are not shown. Assuming zero phase at the output of the buffer amplifier 25, the phases of the outputs of the buffer amplifiers 26, 27 and 28 are 180°, 90° and 270° respectively. Each of these buffer amplifiers can be arranged to deliver the 10 volt output with a source impedance of approximately 2 ohms, and to provide R. M. S. currents up to 10 ma. max. If high impedance loads only were to be connected to the oscillator, the buffer amplifiers would, of course, be unnecessary.

Suitable forms of each of the circuits represented by blocks in Fig. 3 will now be described in more detail with reference to Figs. 4 to 7. All these circuits employ rail voltages of +190 v. and −60 v. with respect to earth, and it is assumed that low impedance supplies are employed in each case. Suitable values of components are indicated in the figures.

A circuit diagram of a unity gain amplifier for use as sections AMP.1 and AMP.3 is shown in Fig. 4. The amplifier in question is of a degenerative feedback type, employing two stages of amplification 29 and 30 and a cathode follower 31, with overall negative feedback returned by lead 32 from the cathode follower output to the cathode of the first amplifier 29.

This form of amplifier is known and is often referred to as a "ring of three." The input circuit of the amplifier is required to operate at high impedance and, consequently, in order to minimise hum and microphony effects, a double ended low microphony valve is employed at 29. The output from the first amplifier stage 29 is directly coupled to the grid of the second amplifier 30 through a dividing potentiometer comprising resistors 33 and 34 connected to the negative rail, in order to establish a suitable quiescent voltage level. The second amplifying stage 30 is similarly coupled to the cathode follower 31.

Almost the whole of the signal present at the output of the cathode follower 31 is returned as feedback by lead 32 to the cathode of the first amplifier 29. The small reduction in the feedback voltage, as principally determined by a potentiometer comprising resistors 35 and 36, is used to secure a nominal overall amplifier gain of unity.

A variable resistor 37 in the cathode circuit of the first amplifier 29 permits adjustment of the nominal quiescent output voltage to zero.

The natural tendency of the amplifier to oscillate at a very high frequency is eliminated, partly by utilising a capacitor 38 connected between the cathodes of the cathode follower 31 and the first amplifier 29, and partly by connection of a capacitor 39 in series with a resistor 40 in the anode circuit of the second amplifier 30. Each of these connections reduces the phase lag in the amplifier at high frequencies, and the combined effect is to hold the total phase shift within the loop to less than 180° until such time as the loop gain has fallen to a value below unity.

Figure 5:
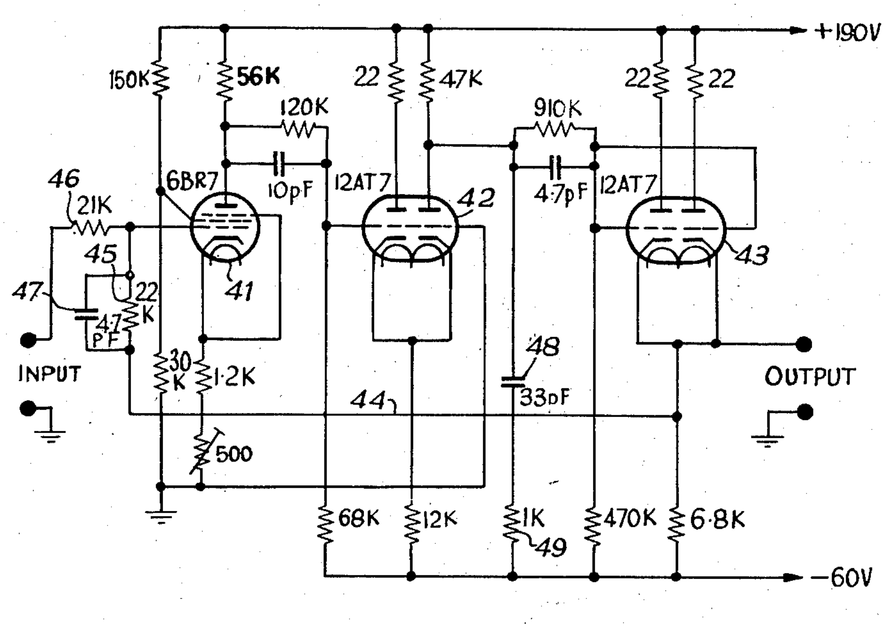
Figure 5 shows a circuit diagram of an image amplifier suitable for use in the oscillator system of Fig. 3.

The circuit diagram of an amplifier suitable for use for amplifier sections AMP.2 and AMP.5 is shown in Fig. 5. Once again there is used a degenerative feedback amplifier, basically comprising two stages of forward amplification with an output cathode follower, but in this case, as an overall gain of <1 is required, it is necessary to cathode-couple into one amplifier stage and return the negative feedback to the grid circuit of the first amplifier. Thus the amplifier comprises a first stage 41 connected to the input through a resistor 46 and direct-coupled to the first section of a double triode 42 having a common cathode circuit. The second section of the double triode is direct-coupled to a further double triode 43 which is parallel-connected.

The overall behaviour can best be appreciated by considering the function of each stage when a signal is applied to the input. Assume, therefore, that a positive voltage be applied to the live input terminal. This voltage will drive the grid of the first amplifier 41 positive, thus transmitting a negative signal from the anode of this valve to the grid of the first section of the double triode 42. The first section of this double triode operates as a cathode follower and injects the signal into the cathode of the second section of the same double triode. Conduction in this valve section is thus increased, and consequently the anode of this valve goes negative. This negative signal is applied to the grid of the output cathode follower 43 and is returned by a lead 44 as degenerative feedback to the grid circuit of the first amplifier valve 41 through a resistor 45.

If the amplifier input resistor 46 and feedback resistor 45 were of equal value and if the overall gain of the amplifier were infinite, it will be readily apparent that application of a positive voltage to the input terminals would result in an equal but opposite voltage being produced at the output terminals. However, in view of the finite gain of the amplifier employed, it is necessary to mis-match slightly the input and feedback resistors 46 and 45, in order to establish an overall gain of <1. The actual values employed in the circuit under consideration are 21K ohms for the input resistor 46 and 22K ohms for the feedback resistor 45.

Elimination of high frequency oscillations is achieved by means of a capacitor 47 in parallel with the feedback resistor 45, and a capacitor 48 series connected with a resistor 49 across the anode circuit of the second amplifying stage 42.

Figure 6:
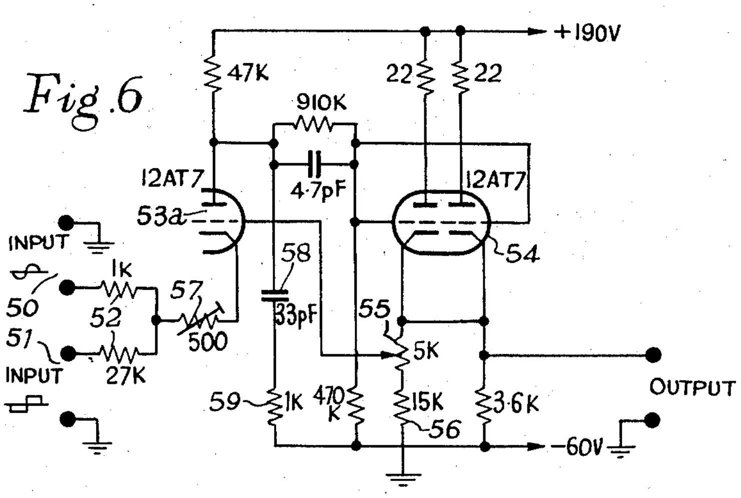
Figure 6 shows a circuit diagram for a maintaining amplifier suitable for use in the oscillator system of Fig. 3.

A circuit diagram for an amplifier suitable for use as the amplifier section AMP.4 is shown in Fig. 6. One of the principal function of this section is to permit addition, in suitable proportions, of the sinusoidal and square wave components employed to provide the required overall gain. The two pairs of input terminals 50 and 51 shown in Fig. 6 bring in respectively the sinusoidal and square wave input voltages. A potentiometer 52, comprising resistors of 1K ohm and 27K ohms, adds together these signals in a ratio of approximately 27:1 in favour of the sinusoidal input. The signal, after addition, is applied to the cathode circuit of a valve 53*a*, which may be one half of a double triode type 12AT7. The amplified signal appearing at the anode of this valve is coupled to a cathode follower 54 comprising the two sections of a double triode parallel strapped. Part of the signal present at the cathode follower output, as determined by a potentiometer 55 and a fixed resistor 56, is returned as degenerative feedback to the control grid of the valve 53*a*. When the potentiometer 55 is adjusted for maximum feedback, the overall gain may be arranged to be slightly less than unity; by adjustment of this potentiometer, the overall gain can be increased to a value slightly in excess of unity, thus maintaining oscillation.

A variable resistor 57, connected in the cathode circuit of the valve 53*a*, permits the adjustment of the quiescent output voltage. A capacitor 58 in series with a resistor 59 connected in the amplifier anode circuit offsets the tendency to increase amplification at very high frequencies.

Figure 7:
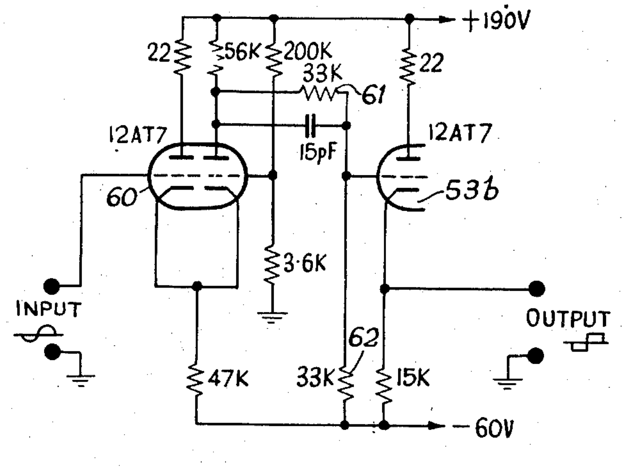
Figure 7 shows a circuit diagram of a squaring circuit suitable for use in the oscillator system of Fig. 3.

A circuit diagram of a squaring circuit is illustrated in Fig. 7. The function of this circuit is to amplify the applied sinusoidal input, and symmetrically to clip both the positive and negative half cycles at a peak amplitude of 10 volts. The input signal is applied to the first section of a double triode 60 connected as a cathode follower, the two cathodes being connected together. The first section is thus cathode-coupled into an amplifying stage constituted by the second section of the valve 60. The control grid of the amplifying stage is held at a potential such that, when the driving cathode follower is cut off, the anode potential of the amplifier stage will fall by 20 volts. When the cathode follower stage applies sufficient drive to cut off the amplifier stage, the anode of the amplifier stage is arranged to rise to a potential which is 20 volts in excess of the quiescent value. Consequently, under conditions where the input is a sinusoidal voltage of very large amplitude, the signal present at the anode of the amplifying stage is a square wave with a peak-to-peak amplitude of 40 volts. One half of this anode voltage, as determined by a potentiometer comprising two equal resistors 61 and 62, is applied to the output terminals by means of a cathode follower 53*b*, which may be the other half of the double triode providing the valve 53*a* in Fig. 6.

Whilst it is not intended to limit the present invention to any particular theoretical explanation of the operation, it may be mentioned that it is at present believed that the controlling action of the square wave, in keeping constant the amplitude of the sinusoidal wave, can be explained by describing, by way of example, how the constant amplitude would be maintained, if for some reason the amplitude of the sinusoidal component of the input to the amplifier section AMP.4 of Fig. 3 were to increase.

When the amplitude of the sine wave increases, the output of the amplifier will momentarily increase and supply a greater input to the squaring circuit (Fig. 7). By virtue of its design, however, the squaring circuit will still give a square wave output of the same frequency as the injected sine wave and at a constant amplitude, despite the increase in amplitude of the sine wave input. The effect is that the amplitude of the square wave input to the amplifier section AMP.4 is no longer sufficient, when added to that of the incoming sine wave, to give the required overall gain needed to maintain a state of oscillation at the increased amplitude of the incoming sine wave. Thus the increase in amplitude of the sine wave cannot be maintained by the regenerative feedback circuit and therefore the amplitude will fall to its desired level.

Similarly, if the amplitude of the sine wave input to the amplifier section AMP.4 decreases, the constant amplitude of the square wave input plus the amplitude of the sine wave, provides more overall gain than is required to maintain the sinusoidal oscillation at its new amplitude. The regenerative feedback will therefore increase the sine wave amplitude up to its desired level. Consequently the squaring circuit acts as an amplitude control device.

The phase-shifting means as hereinbefore described with reference to Fig. 3, and constituted by two amplifier sections AMP.1 and AMP.2, or AMP.3 and AMP.5, in combination with phase-shifting networks 16 or 17, introduces very much less variation of amplitude than the conventional types. The conventional types of phase shifting networks used in resistance-capacity feedback oscillators are prone to introduce amplitude variations, especially where the variable components are not exactly matched in value; and the provision of variable resistors with highly accurate matching over their range of control is very expensive. The phase-shifting means constituting a feature of this invention gives much less amplitude variation even if the resistors are not accurately matched. This is evident from the fact that with any given values of resistance and capacitance in the network and with oscillations of like constant voltage and in opposite phase applied to the two extremities of the network, a variation in the frequency of the said voltages does not give rise to any variation in amplitude of the voltage at the junction of the resistor and capacitor but only to a variation in the phase of such voltage. Thus this form of phase-shifting means gives a measure of amplitude stability in itself. However, the phase-shifting means are especially suitable for use in conjunction with the square wave stabilisation device, since in combination they give a high degree of stability which the square wave stabilising device cannot give with a conventional network. The phase shifting means also has the advantage that it provides voltages with 90° phase difference (in the preferred form all four 90° phase differences are available). These 90° phase displaced voltages have a number of applications and increase the value of the oscillator; in particular however they are useful as a source of two voltages at 90° phase difference for an amplitude measuring device such as that described with reference to Fig. 2.

Amplifier sections forming parts of the phase-shifting means as described and illustrated are designed to operate with 90° phase shift networks having any resistive component between 10M ohms and 10K ohms, thus giving a frequency range of 1000:1 for a fixed value of capacitance. If resistors in excess of 10M ohms were to be employed in the networks, the amplifier sections fed from the networks would need to have an increased input impedance; similarly, if resistors of less than 10K ohms were to be used, it would be necessary to provide lower output impedance from the associated amplifier sections which feed the networks.

Figure 8:
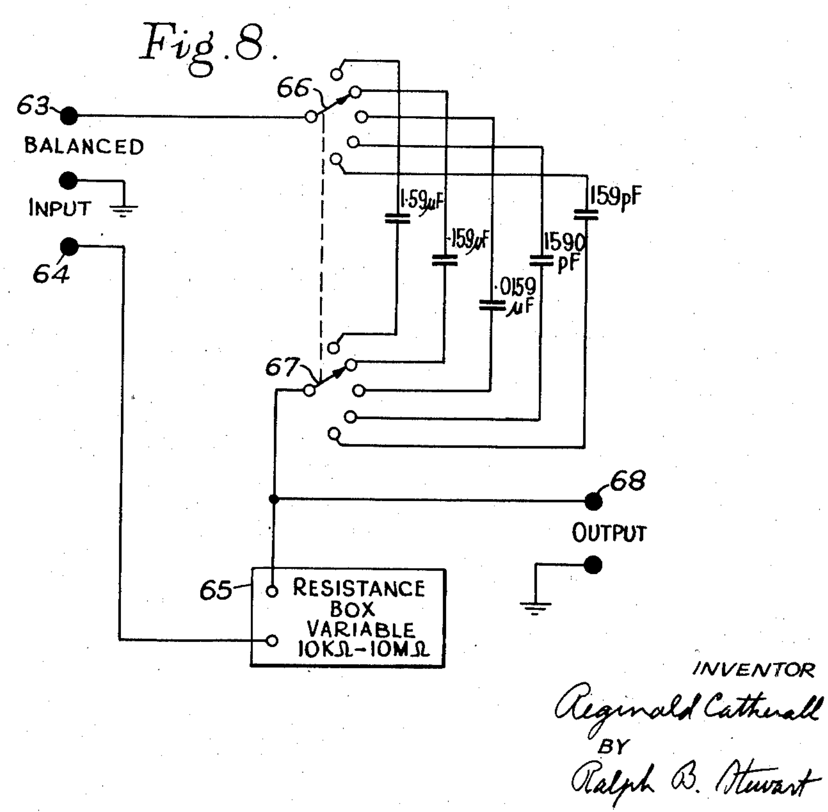
Figure 8 shows a circuit diagram for a phase-shifting network suitable for use in the oscillator system of Fig. 3.

A phase shifting network suitable for use in the invention is illustrated in Fig. 8. Two inputs balanced with respect to earth are applied at terminals 63 and 64. The value of the resistance in the network is adjustable by means of a resistance box 65, the value of capacitance is variable by means of ganged switches 66 and 67, and the output is taken at a terminal 68. The values of the components shown in Fig. 8 give a frequency range of .01 C. P. S. to 100 Kc. P. S. and the variations are conveniently arranged to be in decade steps.

I claim:

1. A low frequency oscillation generator comprising an amplifier having at least two cascade-coupled stages, a regenerative loop circuit coupling the output to the input of said amplifier, a phase-shifting network connected in said loop circuit, an amplitude-stabilizing loop circuit connected between points in said regenerative loop circuit embracing at least one stage of said amplifier, and waveform-squaring means connected in the last-named loop circuit.

2. An oscillation generator according to claim 1, wherein said amplifier is a direct-coupled amplifier.

3. An oscillation generator according to claim 1, wherein said amplifier comprises a plurality of cascade-connected amplifier sections each having at least one stage and wherein degenerative feedback is provided in each of said sections.

4. An oscillation generator according to claim 3, wherein at least one of said sections has a gain of approximately unity and the remainder of said sections a gain of approximately minus unity.

5. An oscillation generator according to claim 3, comprising means for varying the gain of one of said sections.

6. An oscillation generator according to claim 5, wherein said amplitude-stabilising loop circuit is connected between the output and input of said section provided with gain-varying means.

7. An oscillation generator according to claim 1, wherein said amplifier comprises a plurality of sections, two of said sections having output terminals at which the oscillations have substantially the same amplitude and opposite phase, said phase-shifting network being connected between said terminals and a point on said phase-shifting network being connected to the input of another of said sections.

8. An oscillation generator according to claim 1, wherein said amplifier comprises a plurality of sections, two of said sections having output terminals at which the oscillations are substantially in phase quadrature, and wherein voltage measuring means are connected between said terminals, said measuring means giving an indication dependent upon the sum of the squares of the amplitude of the oscillations at said terminals.

9. An oscillation generator according to claim 8, wherein said measuring means comprise vacuum junction thermocouples.

References Cited in the file of this patent

UNITED STATES PATENTS

| | | |
|---|---|---|
| 2,281,238 | Greenwood | Apr. 28, 1942 |
| 2,346,396 | Rider | Apr. 11, 1944 |
| 2,512,927 | Freas | June 27, 1950 |
| 2,651,717 | Uttley et al. | Sept. 8, 1953 |